(12) United States Patent
Kuroiwa

(10) Patent No.: US 6,938,498 B2
(45) Date of Patent: Sep. 6, 2005

(54) HYDROCARBON GAS FLOW RATE ADJUSTING METHOD AND APPARATUS

(75) Inventor: Tamotsu Kuroiwa, Tokyo (JP)

(73) Assignee: The Japan Smoking Articles Corporate Association, Tokyo (JP)

( * ) Notice: Subject to any disclaimer, the term of this patent is extended or adjusted under 35 U.S.C. 154(b) by 16 days.

(21) Appl. No.: 10/452,200

(22) Filed: Jun. 3, 2003

(65) Prior Publication Data

US 2004/0244500 A1 Dec. 9, 2004

(51) Int. Cl.$^7$ ................................................ G01F 1/37
(52) U.S. Cl. .................................................. 73/861.52
(58) Field of Search ........................ 73/861.52, 861.51, 73/861.53, 861.54, 861.55, 861.56

(56) References Cited

U.S. PATENT DOCUMENTS 4,876,884 A * 10/1989 Jansch ........................ 73/49.1
5,295,790 A * 3/1994 Bossart et al. ................. 417/43
6,619,138 B2 * 9/2003 Kettle et al. ............. 73/861.52
6,619,139 B2 * 9/2003 Popp ....................... 73/861.52

* cited by examiner

Primary Examiner—Edward Lefkowitz
Assistant Examiner—Jewel V. Thompson
(74) Attorney, Agent, or Firm—Snider & Associates; Ronald R. Snider

(57) ABSTRACT

An object of the present invention is to provide a hydrocarbon gas flow rate adjusting method and apparatus, which suppress deterioration of an elastic foamed body with the passage of time and enables a stabilized adjustment of the flow rate for a long period by combining a fine porous film with a porous elastic foamed body. More specifically, fuel gas taken out of a tank which stores hydrocarbon fuel gas in liquid phase is controlled in its flow rate such that the upper limit of the flow rate is the maximum flow rate obtained by depressurizing the fuel gas with a flow rate restricting member as a first stage and then adjusting to an arbitrary flow rate within a range of the restricted maximum flow rate with an adjustable flow rate adjusting member.

11 Claims, 5 Drawing Sheets

HYDROCARBON GAS FLOW RATE ADJUSTING METHOD AND APPARATUS

BACKGROUND OF THE INVENTION

1. Field of the Invention

The present invention relates to a hydrocarbon liquefied gas adjusting method and apparatus.

2. Description of Related Art

Conventionally, a gas flow rate adjusting apparatus in which fuel gas is taken out of a tank through opening/closing valve means having a flow rate adjusting mechanism and ignitor. The fuel gas is, for example, a hydrocarbon base and stored in a pressure tank having a predetermined volume in a liquid form. For example, this gas flow rate adjusting apparatus is used to take out fuel gas in the field of, for example, a cigarette lighter, anignitor, and a portable gas cylinder. The cigarette lighter and other these devices contain a pressure tank capable of storing a relatively small amount of petroleum gas therein in a liquid form. The flow rate of fuel gas contained in the tank is adjusted by pressing from outside a flow rate adjusting member composed of a porous elastic foamed body such as a multi-porous spongy like material which is commonly used in cigarette lighters to adjust flow rate, hereinafter referred to as moltpren. Gas is taken out through the opening/closing valve means, and spouted from, for example, a burner nozzle so as to form a flame for igniting a cigarette. The moltpren is an elastic foamed body having continuous pores and is used for adjusting the flow rate of passing gas by changing a total area of the pores when the elastic foamed body is pressed. Such a flow rate adjusting mechanism using the moltpren has been well known and widely used to adjust the length of flame of a cigarette lighter.

When gas in a tank which stores fuel gas is adjusted with the moltpren, first, the moltpren needs to be compressed to a thickness substantially by half or more in order to secure its maximum flow rate range. The moltpren is compressed in a finer adjusting range so as to obtain a desired flame length. When the moltpren is compressed into the maximum flow rate range. It is compressed so as to ensure an arbitrary flow rate. Adjustment from its maximum value to its minimum value is achieved within compressibility in a very small range of compression. Thus, because the porous elastic foamed body is compressed with a high compressibility so as to ensure the maximum flow rate range, it is used in a condition in which it is likely to deteriorate with a passage of time and therefore, elastic restoration of the moltpren is worsened with time passage so that a stabilized flow rate adjustment cannot be achieved after a long time. Next, the moltpren is secondarily compressed further within the adjusted maxi mum flow rate range so as to obtain an arbitrary f lame length. Because this secondary compression is a compression within a very small range, the moltpren compression mechanism is constituted of a rotation mechanism such as screws. A screw mechanism must be rotated within a small angle range, so that a high precision flow rate adjusting mechanism is needed and a high cost is required. Further, because the flame length is largely changed with a small rotation operation, a fine adjustment rotation operation is needed, so that there is no easy control in obtaining an arbitrary flame length.

According to other proposed inexpensive and disposable cigarette lighters, instead of the above-described flow rate adjustment with the moltpren, the flow rate of the fuel gas is set to a predetermined amount at the time of shipment from factory using a flow rate restricting member composed of fine porous film such as membrane film. Arbitrary flow rate adjustment is prohibited. The membrane film is a porous film body having a number of fine pores through which when fluid passes. The pressure of fluid is dropped and when gas is passed through fine pores, the pressure of gas is dropped so as to restrict the maximum value of the flow rate. Although such a flow rate restricting member is capable of limiting the flow rate within a predetermined maximum value range, the fine pores in the film are kept in a predetermined size so that the sectional area cannot be changed. Therefore, the flow rate cannot be changed from outside. If gas pressure is changed due to changes in outside temperature, the flow rate is changed thereby leading to changes in flame length. A gas flow rate adjusting apparatus using such a membrane film has been disclosed in, for example, Japanese Patent Application Laid-Open No. 1993-180359.

SUMMARY OF THE INVENTION

An object of the present invention is to provide a gas flow rate adjusting apparatus in which deterioration of the elastic foamed body with passage of time is suppressed by combining fine porous film with the porous elastic foamed body so as to attain stabilized adjustment of the flow rate for a long time.

To achieve the above described object, according to a first aspect of the present invention, there is provided a hydrocarbon gas flow rate adjusting method, in which fuel gas taken out of a tank which stores the hydrocarbon fuel gas in liquid phase is controlled in its flow rate such that an upper limit flow rate of usage range thereof is a maximum flow rate, comprising the steps of: depressurizing the fuel gas with a flow rate restricting member as a first stage, and adjusting a narbitrary flow rate with in a range of the restricted maximum flow rate with a flow rate adjusting member adjustable from outside.

According to a second aspect of the present invention is that the flow rate restricting member is composed of the porous film body of synthetic resin and a flow rate adjusting member is composed of porous elastic foamed body having continuous pores.

According to a third aspect of the present invention is that after the flow rate of fuel gas flowing from the tank to the fine porous film is throttled at midway. Releasing the throttled flow rate in front of the fine porous film so as to make the pressure per a unit area in the fine porous film drop.

According to a fourth aspect of the present invention, there is provided a hydrocarbon gas flow rate adjusting apparatus comprising: a storage tank for storing hydrocarbon fuel gas in liquid phase; a flow rate restricting member for controlling the flow rate of the fuel gas such that the upper limit flow rate of usage range is the maximum flow rate obtained by depressurizing the fuel gas taken out of the storage tank; a flow rate adjusting member for adjusting the flow rate within a range of the restricted maximum flow rate; and means for compressing the flow rate adjusting member from outside, wherein the flow rate adjusting member is disposed downstream from the flow rate restricting member.

According to a fifth aspect of the present invention is that the flow rate restricting member comprises a fine porous film body of synthetic resin and the flow rate adjusting member comprises a porous elastic foamed body having continuous pores.

According to a sixth aspect of the present invention is that a fixed cylinder which is fixed in a tank which stores fuel gas in liquid phase and which communicates with the inside of the tank, a porous elastic foamed body disposed in the fixed cylinder, a flow rate adjusting body for compressing the porous elastic foamed body which is freely operable from outside, and a fine porous film which is disposed between the porous elastic foamed body and the tank.

According to a seventh aspect of the present invention is that the flow rate adjusting body is projected outwardly from a bottom of the tank while the fine porous film is incorporated in the flow rate adjusting body.

According to an eighth aspect of the present invention is that a fuel gas charging mechanism is built in the flow rate adjusting body.

According to a ninth aspect of the present invention is that the flow rate adjusting body is projected outwardly from the top portion of the tank and a burner nozzle means for taking out fuel gas for ignition is built in the flow rate adjusting body.

According to a tenth aspect of the present invention is that a membrane film is fixed in a cylindrical capsule running axially so as to form a single unit.

According to an eleventh aspect of the present invention is that a throttling member having a passage capable of throttling the flow rate of fuel gas is disposed in front of the capsule.

According to a twelfth aspect of the present invention, there is provided a hydrocarbon gas flow rate adjusting apparatus comprising: a storage tank for storing hydrocarbon fuel gas in liquid phase; a flow rate restricting member for controlling the flow rate of the fuel gas wherein the upper limit flow rate of gas usage range is the maximum flow rate which occurs by depressurizing the fuel gas taken out of the storage tank; a flow rate adjusting member for adjusting the flow rate within a range of the restricted maximum flow rate; and means for freely compressing the flow rate adjusting member from outside, wherein the flow rate adjusting member is disposed downstream of the flow rate restricting member while a burner nozzle means for introducing gas after the flow rate is adjusted with the flow rate adjusting member to outside for ignition is disposed in the downstream of the flow rate adjusting member.

DETAILED DESCRIPTION OF THE PREFERRED EMBODIMENTS

The preferred embodiments of the present invention will be described in detail with reference to the accompanying drawings. According to the present invention, a membrane film and a moltpren are combined and at a first stage, the pressure of fuel gas taken out of a tank is limited with the membrane film and as a second stage, the fuel gas is adjusted to an arbitrary flow rate through the moltpren within the range of such a limited pressure. The upper limit flow rate of the usage range of the fuel gas can be adjusted to its maximum flow rate with the membrane film at the first stage. After the membrane film limits the maximum value of the pressure of the fuel gas, the moltpren adjusts the flow rate within this limited pressure range. Consequently, the compressibility of the moltpren which is flow rate adjusting means at the second stage can be reduced, so that deterioration of the moltpren over time can be reduced thereby ensuring a stabilized flow rate adjustment for a long term. The membrane film is disposed within a gas flow path, and after reducing the gas pressure with the fine pores in the membrane film so as to limit the gas flow rate within a predetermined range, the moltpren is compressed from outside to attain a secondary adjustment of the gas flow rate, and then gas is taken out through a burner nozzle or the like for usage for ignition. The moltpren is disposed downstream of the membrane film and the flow rate of gas is adjusted within the range of the limited gas pressure. Consequently, the compressibility can be reduced further as compared to a conventional case where the moltpren single body is compressed so as to obtain the maximum value of the flow rate, thereby deterioration of the moltpren with a time passage is suppressed.

Figure 1:
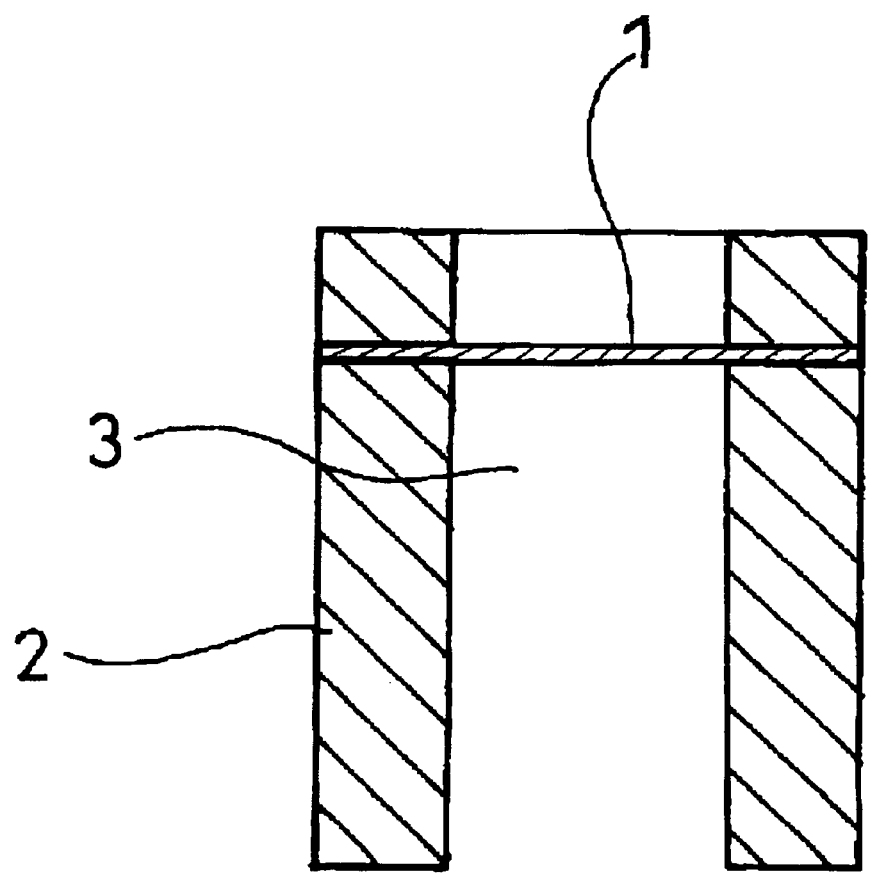
FIG. 1 is a sectional view showing an example of a capsule for holding a membrane film.
Figure 2:
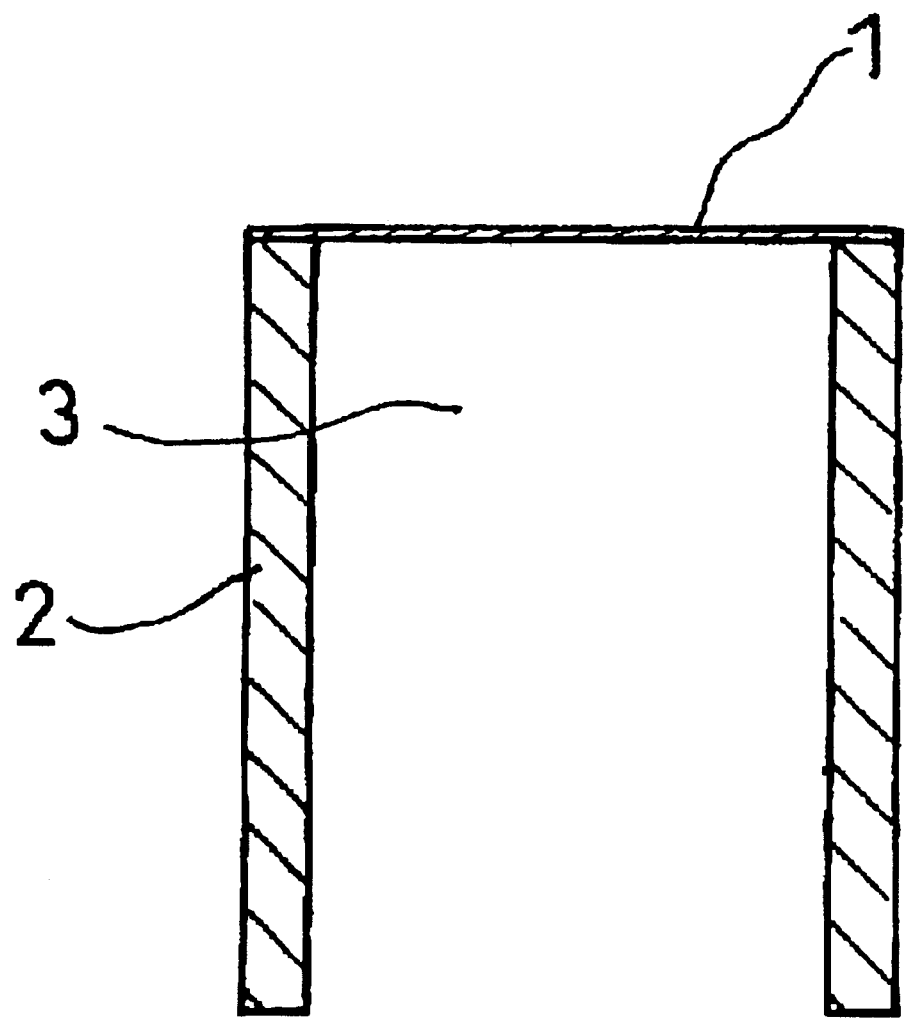
FIG. 2 is a sectional view showing other example of the capsule for holding a membrane film.

Preferably, the membrane film is fixed to a cylindrical capsule having an axial through passage which forms an independent unit structure, which makes easy incorporation into the flow rate adjusting mechanism. FIGS. 1, 2 show examples of the unit structures each composed of a capsule 2 to which the membrane film 1 is fixed. FIG. 1 shows a structure in which the membrane film is attached to the midway of the capsule, and FIG. 2 shows a structure in which the membrane film is attached to a rear end of the capsule. The membrane film fixed to the capsule is located to close the passage extending in the axial direction of the capsule and fuel gas passing through the passage of the capsule is depressurized when it passes the fine pores in the membrane film, so that its maximum flow rate is limited. Such a capsule is incorporated inside the flow rate adjusting mechanism while maintaining air tightness and part of a passage from the fuel tank to a nozzle is formed with the passage in the capsule, so that pressure of fuel gas within the storage tank is reduced while the gas is fed to the moltpren on a subsequent stage. In the meantime, needless to say, the structure of the capsule to which the membrane film is attached is not limited to the structure shown in the same Figure.

Although, preferably, the membrane film is a fine porous film composed of, for example, polypropylene, polytetrafluorethylene, polycarbonate or other synthetic resin, it is not restricted to these films. Although, preferably, the thickness of the membrane film is 20 to 60 $\mu$m while the diameter of the fine pore is 0.5 to 5.0 $\mu$m, they are not restricted to these values. Although the capsule is preferred to be formed of polypropylene, it is not restricted to this, however it may be formed of polyacetal, polystyrene, polyvinyl chloride, urethane or the like. The membrane film may be formed by overlaying unwoven fabrics.

First Embodiment

Figure 3:
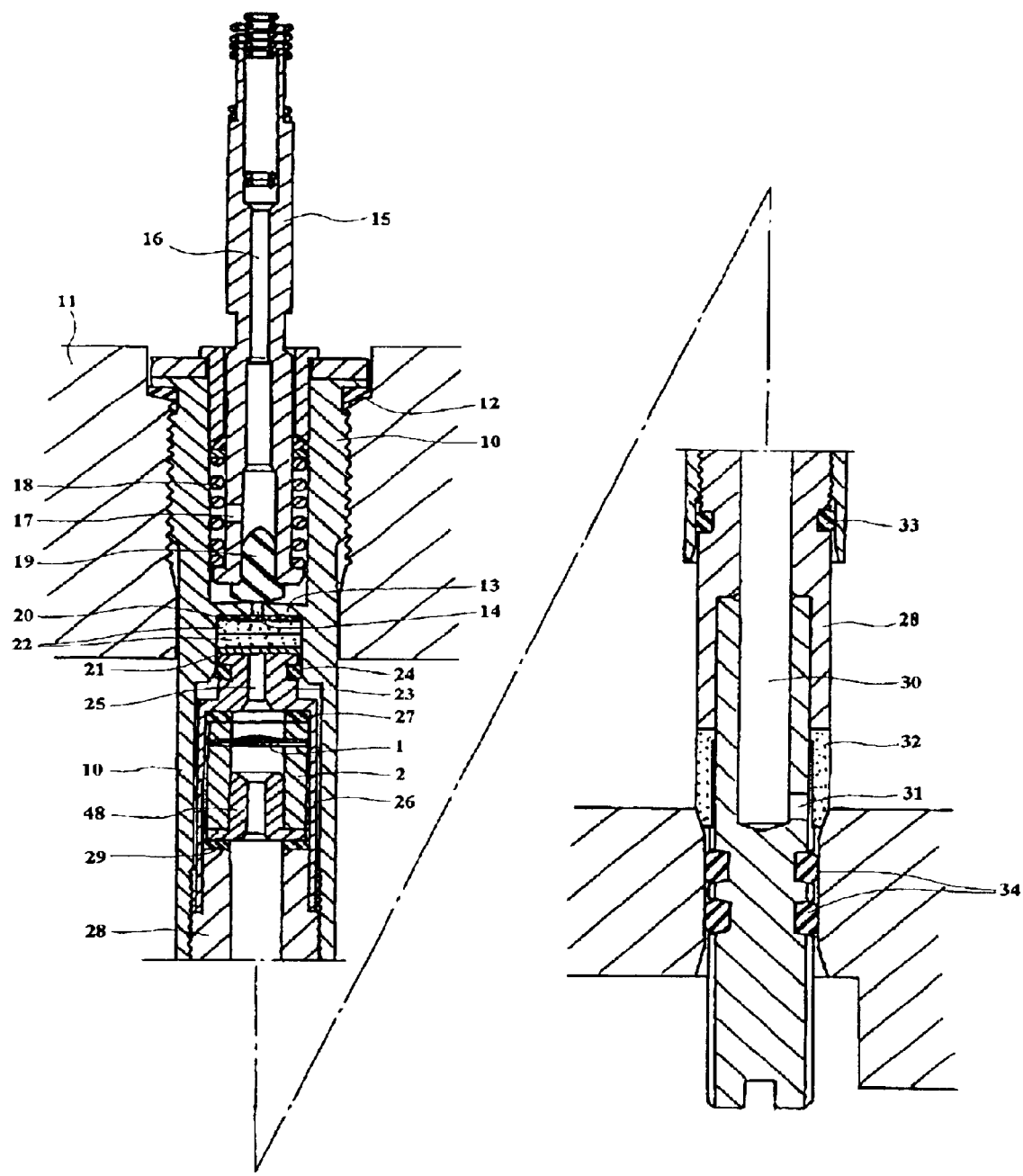
FIG. 3 is a sectional view showing a first embodiment of the flow rate adjusting apparatus of the present invention.

Referring to FIG. 3, reference numeral 10 denotes a fixed cylinder, which is fixed to a top wall of a storage tank 11 which stores fuel gas in a liquid phase through an O-ring 12 while maintaining air tightness. The fixed cylinder 10 constitutes a main body member of a flow rate adjusting apparatus, which is composed of cylinders containing a chamber running through vertically while upper and lower chambers are partitioned with a partition wall 13 located substantially in the center. The upper and lower chambers are made to communicate with each other through a through hole 14 made in the center of the partition wall 13. A burner nozzle body 15 is inserted into a chamber located above the partition wall 13. A gas spouting path 16 is provided axially in the center of the burner nozzle body 15 and communicates with the upper chamber through lateral holes 17. Fuel gas spouted from a top end of the burner nozzle body 15 is ignited with an ignition spark formed by such an appropriate ignition means as electric spark, piezoelectric spark, ignition stone spark and the like. The burner nozzle body 15 is always biased downward by an elastic force of a spring 18 so that a sealing plug 19 composed of such an elastic sealing member as a rubber provided on its bottom end fits to the through hole 14 in the partition wall 13 so as to block spouting of gas. When the burner nozzle body 15 is lifted upward by a lever-like operating member connected to the neck portion resisting the spring 18, the sealing plug 19 is separated from the through hole, thereby allowing the gas to be spouted.

In a chamber below the partition wall 13, moltpren 22 is disposed such that it is held between a wire net 20 adjacent a bottom face of the partition wall 13 and a grooved washer 21. The moltpren 22 is a sponge-like elastic foamed body containing continuous pores and capable of adjusting the flow rate of gas passing there by compressing to reduce the thickness thereof. This has been used conventionally as a flame length adjusting member of a gas lighter for smoking. A molt pressing body 23 is provided below the grooved washer 21 such that it is capable of moving vertically and an O-ring 24 seals between the lower chamber and the outer peripheral face of the molt pressing body 23, so that fuel gas passes through a center hole 25 in the molt pressing body 23 and flows through the moltpren 22. A capsule accommodating cylinder 26 is provided integrally under the moltpren pressing body 23, and the capsule accommodating cylinder 26 contains a capsule 2 which holds the membrane film 1 shown in FIGS. 2, 3. Although in the indicated embodiment, the capsule shown in FIG. 2 is accommodated, needless to say, it is permissible to use the capsule shown in FIG. 1. A gasket 27 seals between the accommodated capsule 2 and the moltpren pressing body 23. A throttling member 48 is inserted into the capsule 2.

Reference numeral 28 denotes a flow rate adjusting body, which is inserted into a fixed cylinder 10 movably in the vertical direction while its bottom end is projected outwardly through a bottom wall of the storage tank 11 and which can be rotated from outside. A top end of the flow rate adjusting body 28 comes in contact with a bottom face of the throttling member 48 incorporated in the capsule 2 through a gasket 29. A vertical motion of the flow adjusting body 28 is transmitted to the molt pressing body 23 through the gasket 29, the throttling member 48 and the capsule 2, and capable of pressing the moltpren 22. A through central passage 30 is made in the central portion of the flow rate adjusting body 28 and communicates with the inside of the tank 11 through a lateral hole 31. An elastic porous body 32, which is a gas absorption member, is attached to the lateral hole 31. O-rings 33, 34 are attached between the flow rate adjusting body 28 and the fixed cylinder 10 and between the flow rate adjusting body 28 and the storage tank 11 so as to seal therebetween.

Fuel gas in the storage tank 11 is absorbed by the elastic porous body 32 which is a gas absorption member and introduced to the central passage 30 of the flow rate adjusting body 28 and then throttled by the throttling member 48. After that, the gas flows into a wide passage 3 in the capsule 2. After throttled by the throttling member, the fuel gas flows into an enlarged passage 3 in the capsule 2 from the passage in the throttling member. When the gas strikes the membrane film disposed in the wide passage 3, the pressure per unit area of the membrane film drops. When the gas whose pressure is dropped passes through the membrane film 1, the amount of gas is restricted to the maximum flow rate which is the upper limit of its usage range. The gas whose amount is restricted flows into the central hole 25 in the moltpren pressing body 23. After the maximum flow rate is limited, the fuel gas reaches the moltpren 22 and flows down to the burner nozzle body 15 at a flow rate adjusted depending on the compression level of the moltpren 22. Finally, the gas is spouted out from the top end of the burner nozzle body and ignited.

According to the flow rate adjusting method of the present invention, fuel gas in the storage tank is depressurized with the membrane film 1 as the first step and limited so that the upper limit flow rate of the usage range is its maximum flow rate. As a second step, the flow rate of the gas is controlled with the moltpren 22 within the range of the maximum flow rate obtained by reducing and controlling the pressure. Consequently, the flow rate of the fuel gas is adjusted to a desired flame length by the flow rate limitation and flow rate adjustment, which are carried out through two steps each having a different operation. Because the fuel gas adjusted by the moltpren is controlled in terms of its pressure by the membrane film 1 at the first step, the compressibility of the moltpren by an adjustment of the moltpren can be reduced to be considerably smaller than a conventional compressibility, so that deterioration of the moltpren with over time is reduced, thereby achieving a stabilized adjustment of the flow rate for a long time. The compressibility of the moltpren can be changed by rotating the bottom portion of the flow rate adjusting body 28 projected downward from the bottom wall of the storage tank 11 so that it can be adjusted to an arbitrary level. Because the compression of the moltpren 22 by this flow rate adjusting body 28 is an adjustment within the range of the maximum flow rate limited by the membrane film, the range of the compression amount of the moltpren by the flow rate adjusting body 28 is enlarged, so that a large operating range can be obtained for the compression.

Figure 4:
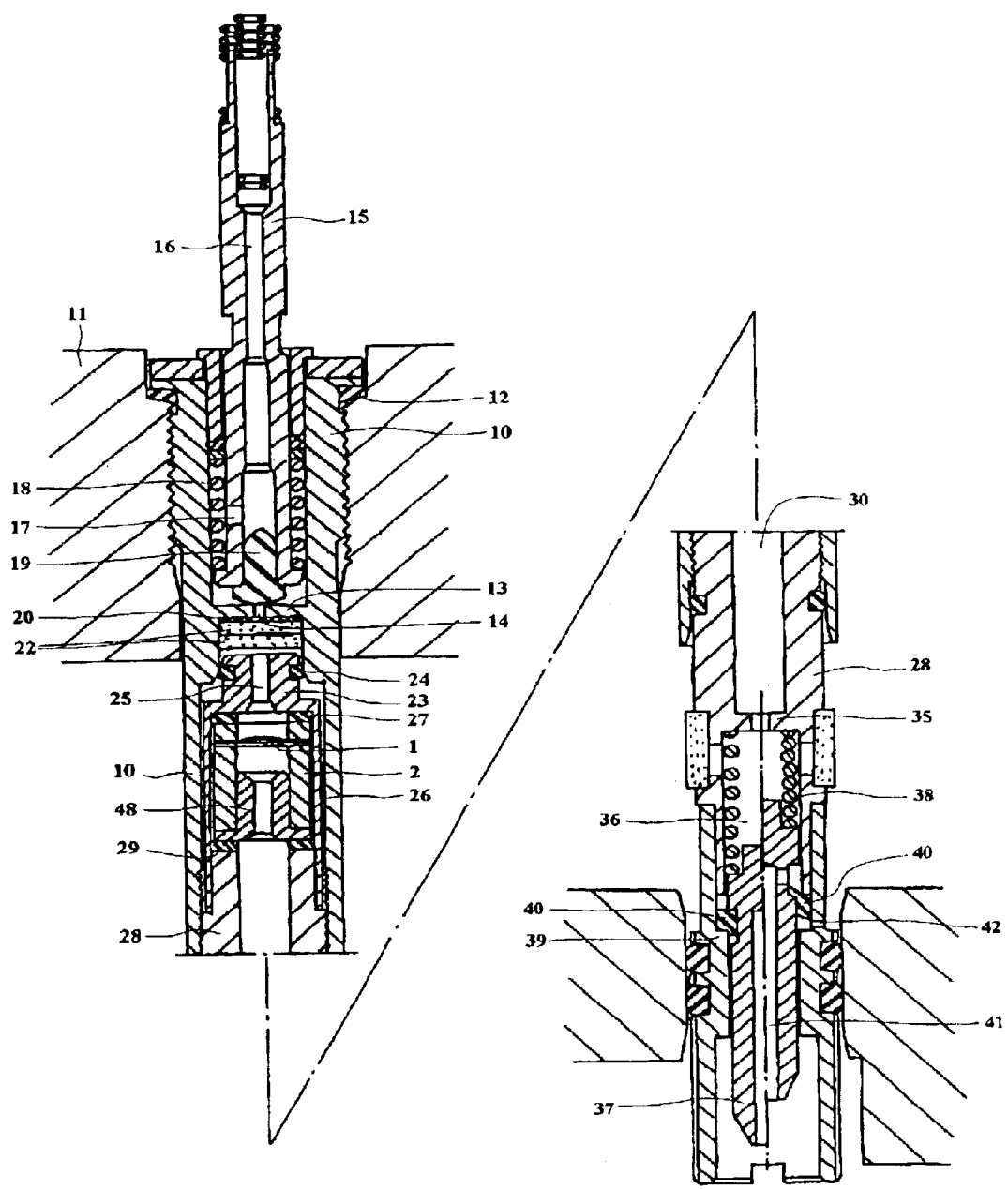
FIG. 4 is a sectional view showing a modification of the first embodiment.

FIG. 4 shows a flow rate adjusting apparatus which is a modification of FIG. 3. Referring to FIG. 4, a fuel gas charging chamber 36 is defined with the partition wall 35 below the flow rate adjusting body 28 such that it is open downward. A gas charging valve is disposed within the fuel gas charging chamber 36. If a gas cylinder is connected to this flow rate adjusting body 28, the storage tank is allowed to be charged freely with the fuel gas. The other points are equal to the structure shown in FIG. 3. The gas charging valve has a valve main body 37 which is always biased by the spring 38 in the direction of closing the valve and includes an elastic valve body 40 disposed between the valve main body 37 and a step portion 39 formed in the fuel gas charging chamber 36. When the valve main body 37 is pressed inwardly resisting the spring 38 (see the right half of FIG. 4), the elastic valve body 40 is deformed so that the passage is made open. Consequently, fuel gas flows into the tank through the central hole 41 to a lateral hole 42 in the valve main body 37 from a gas cylinder (not shown) connected to an outside end of the valve main body 37.

The capsule 2 has the passage 3 with the large internal diameter and preferably, as shown in FIGS. 3, 4, the throttling member 48 is inserted into the passage 3 so as to squeeze the diameter of the flow path, so that gas flows from a narrow path restricted by the throttling member 48 to the wide passage 3 in the capsule 2. Because when the membrane film 1 is disposed in the wide passage, gas pressure per a unit area of the membrane film drops, the operation of the depressurization is improved. Although the throttling member 48 may be formed integrally with the capsule 2, if it is formed separately and combined with the capsule 2, an arbitrary gas pressure reduction operation can be made. Consequently, the degree of freedom in restriction of flow rate due to depressurization provided by the membrane film is increased, which is an advantage of this embodiment.

Figure 5:
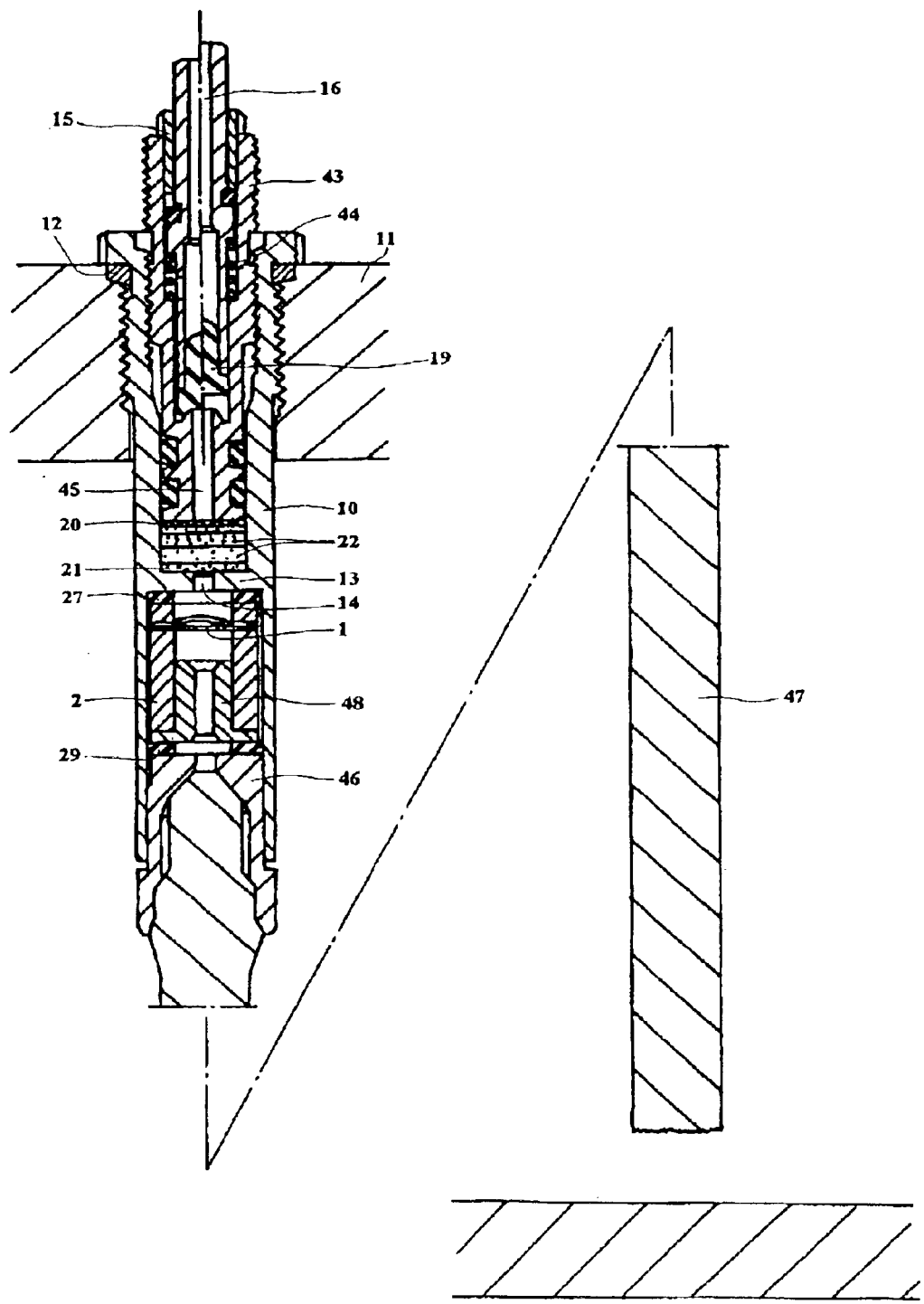
FIG. 5 is a sectional view showing a second embodiment of the flow rate adjusting apparatus of the present invention.

FIG. 5 shows the second embodiment. According to the second embodiment, the rotation of the flow rate adjusting body which presses the moltpren is carried out from above the storage tank, which is different from the first embodiment in which the flow rate adjustment is carried out from below the storage tank. However, the two-stage flow rate adjustment method and structure comprised of the primary adjustment by the membrane film and the secondary adjustment by compression of the moltpren, as characteristics of the present invention, are equal to the first embodiment except such a difference in the flow rate adjusting means. Referring to FIG. 5, the interior of the fixed cylinder 10 fixed to the top wall of the storage tank 11 is divided to two sections, upper and lower ones with the partition wall 13. The moltpren 22 held tightly between grooved washer 21 and the wire net 20 is disposed in the upper chamber adjacent to the partition wall 13, and the moltpren 22 is allowed to be pressed freely by the moltpren pressing body 23. Reference numeral 43 denotes a movable cylinder in which the moltpren pressing body 23 is formed integrally and which is inserted into an upper chamber of the fixed cylinder 10 such that it is movable in a vertical direction. When the movable cylinder 43 is moved vertically, the moltpren pressing body 23 located below compresses the moltpren 22 to a desired extent, thereby adjusting the flow rate of fuel gas to an arbitrary amount. The burner nozzle body 15 is inserted into the movable cylinder 43 while being always biased downward by the spring 44. After the flow rate is adjusted by the moltpren 22, fuel gas passes through a central hole 45 in the molt pressing body and is spouted out from the gas spouting path 16 in the burner nozzle body 15. The capsule 2 incorporating the throttling member 48 having the membrane film 1 is accommodated in the chamber below the partition wall 13 via the gasket 27. A sucking core holding member 46 is disposed below the capsule 2 via the gasket, so that a sucking core 47 extending up to near the bottom of the tank is held by the sucking core holding member 46.

Fuel gas in liquid phase after being sucked up by the sucking core 47 is vaporized and throttled by the throttling member 48, so that the velocity thereof is increased and the fuel gas flows into the capsule 2. After the velocity is increased, the fuel gas flows into an enlarged the passage 3 in the capsule 2 from the passage in the throttling member, so that the velocity of the fuel gas is decreased by the Venturi effect induced thereby while the gas passes through the membrane film 1. After the fuel gas is depressurized, it passes the through hole 14 in the partition wall 13 and reaches the moltpren 22. After the maximum flow rate is restricted by the membrane film, the fuel gas flows down to the burner nozzle body 15 at an arbitrary flow rate adjusted under a compression level of the moltpren 22. Then, the fuel gas is spouted out from the top end of the burner nozzle and ignited with a predetermined flame length.

As described above, according to the present invention, the flow rate restricting member and the flow rate adjusting member are combined using the fine porous film body and the porous elastic foamed body. At the first stage, by reducing the pressure of the fuel gas with the fine porous film body, the flow rate of the fuel gas is controlled such that its upper limit of the usage range is at the maximum flow rate. After the maximum flow rate is controlled, as the second stage, the fuel gas is adjusted under the compression level of the porous elastic foamed body disposed in the downstream. Therefore, the compressibility of the elastic foamed body can be reduced and deterioration of the porous elastic foamed body over time due to the compression is suppressed, so that a stabilized adjustment of the flow rate can be attained for a longtime. Because the fine porous film is held in the capsule as a unit, it is easy to install in the flow rate adjusting apparatus. Further, it is easy to combine the fine porous film with a gasket or O-ring so as to form a structure which holds air tightness.

What is claimed is:

1. A hydrocarbon gas flow rate adjusting method, in which fuel gas taken out of a tank which stores the hydrocarbon fuel gas in liquid phase is controlled in its flow rate such that an upper limit flow rate of usage range thereof is a maximum flow rate, comprising the steps of:

depressurizing the fuel gas with a flow rate restricting member as a first stage, and adjusting to an arbitrary flow rate within a range of the restricted maximum flow rate with a flow rate adjusting member adjustable from outside.

2. The hydrocarbon gas flow rate adjusting method according to claim 1, wherein the flow rate restricting member is composed of fine porous film body of synthetic resin and a flow rate adjusting member is composed of porous elastic foamed body having continuous pores.

3. The hydrocarbon gas flow rate adjusting method according to claim 2, wherein after the flow rate of fuel gas flowing from the tank to the fine porous film is throttled at midway. Releasing the throttled flow rate in front of the fine porous film so as to make the pressure per a unit area in the fine porous film drop.

4. A hydrocarbon gas flow rate adjusting apparatus comprising:

a storage tank for storing hydrocarbon fuel gas in liquid phase;

a flow rate restricting member for controlling the flow rate of the fuel gas such that the upper limit flow rate of usage range is the maximum flow rate obtained by depressurizing the fuel gas taken out of the storage tank;

a flow rate adjusting member for adjusting the flow rate within a range of the restricted maximum flow rate; and means for compressing the flow rate adjusting member from outside, wherein the flow rate adjusting member is disposed downstream from the flow rate restricting member.

5. The flow rate adjusting apparatus according to claim 4, wherein the flow rate restricting member comprises a fine porous film body of synthetic resin and the flow rate adjusting member comprises a porous elastic foamed body having continuous pores.

6. The flow rate adjusting apparatus for an ignitor according to claim 4, comprising:

a fixed cylinder which is fixed in a tank which stores fuel gas in liquid phase and which communicates with the inside of the tank, a porous elastic foamed body is disposed in the fixed cylinder, a flow rate adjusting body for comprising the porous elastic foamed body which is freely operated from outside, and a porous film which is disposed between the porous elastic foamed body and the tank.

7. The flow rate adjusting apparatus according to claim 6, wherein the flow rate adjusting body is projected outwardly from a bottom of the tank while porous film is incorporated in the flow rate adjusting body.

8. The flow rate adjusting apparatus according to claim 6, wherein a fuel gas charging mechanism is built in the flow rate adjusting body.

9. The flow rate adjusting apparatus according to claim 6, wherein the flow rate adjusting body is projected outwardly from the top portion of the tank and a burner nozzle means for taking out fuel gas for ignition is built in the flow rate adjusting body.

10. The flow rate adjusting apparatus according to claim 5, where in a membrane film is fixed in a cylindrical capsule running axially so as to form a single unit.

11. The flow rate adjusting apparatus according to claim 10, wherein a throttling member having a passage capable of throttling the flow rate of fuel gas is disposed in front of the capsule.

* * * * *